United States Patent Office 3,094,552
Patented June 18, 1963

3,094,552
PRODUCTION OF UNSATURATED
ALIPHATIC NITRILES
Barrie Wood, Epsom, England, assignor to The Distillers Company Limited, Edinburgh, Scotland, a British company
No Drawing. Filed Oct. 11, 1960, Ser. No. 61,817
Claims priority, application Great Britain Oct. 28, 1959
12 Claims. (Cl. 260—465.9)

The present invention relates to the production of unsaturated aliphatic nitriles, and in particular to the production of acrylonitrile and methacrylonitrile.

According to the present invention, the process for the production of acrylonitrile or methacrylonitrile comprises reacting at an elevated temperature in the vapour phase acrolein or methacrolein with oxygen and ammonia over an oxidation catalyst comprising (i) a mixture of the oxides of antimony and tin or (ii) a compound of antimony, tin and oxygen.

The catalysts used in the process of the present invention comprise antimony, oxygen and tin and may be regarded either as mixtures of antimony oxides with tin oxides or as oxygen-containing compounds of antimony and tin, such as tin antimonate; under the reaction conditions the catalyst may be present in either or both forms. The catalyst may be prepared in any suitable manner, for instance from the oxides of antimony and tin, or from compounds of tin or antimony, such as the hydroxides, which on heating in the presence of an oxygen-containing gas, such as air, are converted to the oxides. Any of the oxides of antimony and tin or substances yielding these oxides, may be used in the manufacture of the catalyst, such as antimony trioxide, antimony tetroxide, antimony pentoxide or mixtures of such oxides; stannic oxide, stannous oxide, meta-stannic acid or mixtures of such oxides. Hydrated forms of these oxides may also be used, for instance such as are formed by the action of aqueous nitric acid on antimony or tin metals or on mixtures of the metals. We have found that particularly good catalysts are those in which antimony tetroxide is associated, either as a mixture or in combination, with stannic oxide.

The atomic ratio of tin to antimony in the catalysts may vary within moderately wide limits, for instance between 0.1:1 and 10:1, although catalysts containing proportions of tin to antimony outside this range may also be used. Though the catalyst mixture can be used as such, it is sometimes advantageous to subject it to a prior heat-treatment in the presence of an oxygen-containing gas such as air, for instance at a temperature between 550° and 1100° C., and the optimum temperature for the heat-treatment is related to the proportion of antimony to tin in the catalyst. For instance, catalysts containing 2 atoms of tin per atom of antimony give good results when heated at about 950° C.; catalysts containing 1 atom of tin per 4 atoms of antimony give good results when heated at about 700° C.

A particularly preferred method of preparing the antimony oxide/tin oxide catalyst comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550° to 1100° C.

Another preferred method of preparing the antimony oxide/tin oxide catalyst comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the catalyst may be prepared in this way. Particularly useful catalysts can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e. as divalent tin or triavalent antimony compounds, it is particularly preferred to subject the mixture to a preliminary heat-treatment in an atmosphere comprising oxygen and an inert gas such as nitrogen, carbon dioxide or steam, the proportion of oxygen and the total flow of gas being controlled so that no part of the catalyst during this preliminary heat-treatment exceeds a temperature of about 650° C. After this preliminary heat-treatment, the mixture is then subjected to a final heat-treatment in air at a temperature in the range 550° to 1100° C.

The antimony oxide catalyst used in the process of the present invention may, if desired, be deposited on supports, e.g. silica.

The reaction of acrolein or methacrolein with oxygen and ammonia over the catalyst may be carried out in any suitable manner, for instance as a fixed bed process in which the catalyst is used in the form of granules or pellets, or as a fluidised bed process, or as a moving bed process.

The proportion of unsaturated aldehyde in the feed to the reaction may vary within fairly wide limits, for example between 1 and 20% by volume of the feed, and suitably between about 2 and 10% by volume. It is preferred to use between 4 and 6% by volume of the aldehyde in the feed. It is preferred to use acrolein.

The concentration of oxygen in the feed may also vary within moderately wide limits, for example between 1 and 20% by volume and preferably between 2 and 15% by volume. The oxygen may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between 20 and 60% by volume of the feed.

The concentration of ammonia may also vary within moderately wide limits, for instance between 2 and 10% by volume of the feed. If the maximum yield of acrylonitrile is required it is desirable to use an excess of ammonia, for instance such that the gas mixture issuing from the reactor contains at least 1 mole of ammonia for every 10 moles of acrylonitrile. The preferred concentration of ammonia is about 6% by volume of the feed where this contains 5% of acrolein.

The reaction is carried out at an elevated temperature, preferably between 300 and 550° C.

The contact time, defined as the volume of catalyst divided by the flow of gas per second calculated at room temperature and pressure, may be, for example, in the range 1–30 seconds.

The reaction may be carried out at atmospheric pressure, or at super- or sub-atmospheric pressures. It is preferred to operate at a pressure of 1 to 5 atmospheres absolute.

The unsaturated nitrile may be recovered from the reaction products in any suitable manner, for example by extraction with water, preferably at an acid pH, followed by fractional distillation. In one method the hot reaction gases are contacted firstly with a cold dilute aqueous acid solution which neutralises excess ammonia and extracts some of the nitrile, and secondly with cold water to extract the remainder of the nitrile; the nitrile is subsequently recovered from the extracts by fractional distillation.

The process of the invention is further illustrated with reference to the following example, in which all parts are by weight.

*Example*

300.8 parts of stannous chloride ($SnCl_2 \cdot 2H_2O$) were dissolved in 300 parts of 1% hydrochloric acid. This solution was added slowly to 3,000 parts of vigorously stirred water. Simultaneously, 132.9 parts of antimony pentachloride were added dropwise. When the addition was complete the pH of the mixture was adjusted to between 5 and 5.5 by the addition of dilute ammonia solution. After the addition of 500 parts of water, the mixture was cooled to ambient temperature (24° C.). The precipitate was filtered, washed by resuspension in 3,000 parts of water and refiltered. The precipitate was dried at 90° C. for 19 hours and granulated. The granules (8–16 mesh B.S.S.) were heated from 350° C. to 450° C. in a stream of nitrogen, before introducing a small flow of air. The flow of air was so adjusted that the temperature of the catalyst did not exceed 490° C. at any point. When the temperature of the catalyst bed had fallen to 450° C. again, the nitrogen flow was stopped and air was passed over the granules. The catalyst was then heated at 650° C. for 16 hours. The atomic ratio of tin:antimony in the catalyst was 3:1.

14.7 parts of the catalyst were placed in a reactor maintained at 421° C. A gas mixture comprising 2% by volume of acrolein, 87% by volume of air, 8% by volume of nitrogen, and 3% by volume of ammonia was passed over the catalyst, the contact time being 2 seconds.

Of the acrolein fed 74.3% was converted into acrylonitrile, and 7.9% to carbon dioxide. The yield of acrylonitrile based on acrolein consumed was 74.3%.

I claim:

1. The process for the production of an unsaturated aliphatic nitrile selected from the group consisting of acrylonitrile and methacrylonitrile which comprises reacting in the vapour phase an aldehyde selected from the group consisting of acrolein for production of acrylonitrile and methacrolein for production of methacrylonitrile with oxygen and ammonia at a temperature of about 300–550° C., over an oxidation catalyst selected from the group consisting of (1) a mixture of the oxides of antimony and oxides of tin, and (2) a compound of antimony, tin and oxygen.

2. The process as claimed in claim 1 wherein the antimony oxide is antimony tetroxide and the tin oxide is stannic oxide.

3. The process as claimed in claim 1 wherein at least one of the antimony and tin oxides is formed by the action of aqueous nitric acid on the metal.

4. The process as claimed in claim 1 wherein the catalyst is subjected to a prior heat treatment in an oxygen-containing gas between 550° and 1100° C.

5. The process as claimed in claim 1 wherein the atomic ratio of tin to antimony in the catalyst is between 0.1:1 and 10:1.

6. The process as claimed in claim 1 wherein the catalyst is prepared by intimately mixing an oxide selected from stannic oxide, and the hydrated oxide obtained by the action of aqueous nitric acid on tin metal, with an oxide selected from antimony pentoxide, antimony tetroxide, and the hydrated oxide obtained by the action of aqueous nitric acid on antimony metal, and subjecting the resulting mixture to a heat-treatment at 550° to 1100° C.

7. The process as claimed in claim 1 wherein the concentration of aldehyde in the feed is between 4% and 6% by volume.

8. The process as claimed in claim 1 wherein the concentration of oxygen in the feed is between 2% and 15% by volume.

9. The process as claimed in claim 1 wherein the reaction is carried out in the presence of an inert gaseous diluent selected from steam and mixtures of steam and nitrogen.

10. The process as claimed in claim 1 wherein the concentration of ammonia in the feed is between 2 and 10%.

11. The process for the production of an unsaturated aliphatic nitrile selected from the group consisting of acrylonitrile and methacrylonitrile which comprises reacting in the vapour phase an aldehyde selected from the group consisting of acrolein for production of acrylonitrile and methacrolein for production of methacrylonitrile with oxygen and ammonia at a temperature of about 300–550° C., over an oxidation catalyst selected from the group consisting of (1) a mixture of the oxides of antimony and oxides of tin, and (2) a compound of antimony, tin and oxygen, said oxidation catalyst being formed by heating at a temperature between 550° and 1100° C. a mixture of tin, oxide and antimony oxide at least one of which is in the hydrated form and has been prepared by hydrolyzing with water and a cationic salt of the metal.

12. The process for the production of an unsaturated aliphatic nitrile selected from the group consisting of acrylonitrile and methacrylonitrile which comprises reacting in the vapour phase on aldehyde selected from the group consisting of acrolein for production of acrylonitrile and methacrolein for production of methacrylonitrile with oxygen and ammonia at a temperature of about 300–550° C., over an oxidation catalyst selected from the group consisting of (1) a mixture of the oxides of antimony and oxides of tin, and (2) a compound of antimony, tin and oxygen, wherein the tin and antimony compounds are present as divalent tin and trivalent antimony compounds and wherein the mixture is subjected to a preliminary heat treatment in an atmosphere comprising oxygen and an inert gas in which the temperature does not exceed about 650° C. and to a final heat treatment in air at a temperature between 550° and 1100° C.

References Cited in the file of this patent

UNITED STATES PATENTS

| | | |
|---|---|---|
| 2,691,037 | Bellringer et al. | Oct. 5, 1954 |
| 2,904,580 | Idol | Sept. 15, 1959 |